(12) United States Patent
Wang et al.

(10) Patent No.: US 11,691,264 B2
(45) Date of Patent: Jul. 4, 2023

(54) MOBILE ROBOT PERFORMING MULTIPLE DETECTIONS USING IMAGE FRAMES OF SAME OPTICAL SENSOR

(71) Applicant: PixArt Imaging Inc., Hsin-Chu County (TW)

(72) Inventors: Guo-Zhen Wang, Hsin-Chu County (TW); Hui-Hsuan Chen, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 453 days.

(21) Appl. No.: 16/929,232

(22) Filed: Jul. 15, 2020

(65) Prior Publication Data

US 2020/0338744 A1   Oct. 29, 2020

Related U.S. Application Data

(63) Continuation-in-part of application No. 16/425,955, filed on May 30, 2019, now Pat. No. 11,510,539,
(Continued)

(51) Int. Cl.
*B25J 9/00* (2006.01)
*B25J 9/16* (2006.01)
(Continued)

(52) U.S. Cl.
CPC ........... *B25J 9/0003* (2013.01); *B25J 9/1676* (2013.01); *G06T 7/70* (2017.01); *B25J 11/0085* (2013.01)

(58) Field of Classification Search
CPC . A47L 2201/04; A47L 11/4011; G06V 20/58;
G06V 20/56; G06V 10/145; G06V 10/141; G06V 10/60; G06V 10/40; G06V 10/751; G06V 10/20; G05D 2201/0203; G05D 2201/0246; G05D 2201/0248; G05D 2201/0274; G05D 2201/0238;
(Continued)

(56) References Cited

U.S. PATENT DOCUMENTS 4,954,962 A * 9/1990 Evans, Jr. .......... G01C 21/3837
701/28
5,247,173 A  9/1993 Benchetrit et al.
(Continued)

OTHER PUBLICATIONS

Apostolopoulos et al., "Mobile Robot for Automatic Installation of Floor Tiles", Apr. 1996, IEEE, International Conference on Robotics and Automation Minneapolis, Minnesota, pp. 3652-3657(Year: 1996).

*Primary Examiner* — Khoi H Tran
*Assistant Examiner* — Nhi Q Bui
(74) *Attorney, Agent, or Firm* — WPAT, P.C

(57) ABSTRACT

There is provided a mobile robot that performs the obstacle avoidance, positioning and object recognition according to image frames captured by the same optical sensor. The mobile robot includes an optical sensor, a light emitting diode, a laser diode and a processor. The processor identifies an obstacle and a distance thereof according to image frames captured by the optical sensor when the laser diode is emitting light. The processor further performs the positioning and object recognition according to image frames captured by the optical sensor when the light emitting diode is emitting light.

20 Claims, 5 Drawing Sheets

Related U.S. Application Data which is a continuation-in-part of application No. 15/841,376, filed on Dec. 14, 2017, now Pat. No. 10,627,518.

(60) Provisional application No. 62/514,349, filed on Jun. 2, 2017.

(51) Int. Cl.
*G06T 7/70* (2017.01)
*B25J 11/00* (2006.01)

(58) Field of Classification Search
CPC ..... G05D 2201/024; G05D 2201/0242; G05D 2201/0231; G05D 2201/0236; B25J 11/0085; B25J 19/023; B25J 19/022; B25J 19/021; B25J 9/0003; B25J 9/1676; B25J 9/1697; G06T 2207/30261; G06T 2207/521; G06T 2207/10152; G06T 2207/10048; G06T 7/586; G06T 7/00; G06T 7/254; G06T 7/70
See application file for complete search history.

(56) References Cited

U.S. PATENT DOCUMENTS

| | | | |
|---|---|---|---|
| 6,844,871 B1 | 1/2005 | Hinckley et al. | |
| 9,299,516 B2 | 3/2016 | Chen et al. | |
| 9,323,347 B2 | 4/2016 | Liang | |
| 9,606,639 B2 | 3/2017 | Kao et al. | |
| 9,727,148 B2 | 8/2017 | Chin et al. | |
| 2002/0085116 A1 | 7/2002 | Kuwano et al. | |
| 2003/0067613 A1 | 4/2003 | Ishikawa et al. | |
| 2005/0206617 A1 | 9/2005 | Moyer et al. | |
| 2006/0262094 A1 | 11/2006 | Chang | |
| 2008/0260262 A1 | 10/2008 | Lim et al. | |
| 2010/0123655 A1 | 5/2010 | Lai | |
| 2011/0176709 A1* | 7/2011 | Park | G06T 7/521 382/106 |
| 2012/0162072 A1 | 6/2012 | Chen et al. | |
| 2013/0072771 A1 | 3/2013 | Gu et al. | |
| 2013/0127714 A1 | 5/2013 | Gu et al. | |
| 2013/0127721 A1 | 5/2013 | Gu et al. | |
| 2013/0127722 A1 | 5/2013 | Gu et al. | |
| 2013/0131474 A1 | 5/2013 | Gu et al. | |
| 2013/0184865 A1 | 7/2013 | Guo et al. | |
| 2013/0215257 A1 | 8/2013 | Huang et al. | |
| 2013/0329962 A1 | 12/2013 | Kao et al. | |
| 2014/0323835 A1 | 10/2014 | Kao | |
| 2015/0009146 A1 | 1/2015 | Song | |
| 2015/0160743 A1 | 6/2015 | Song et al. | |
| 2015/0168954 A1* | 6/2015 | Hickerson | G01S 17/89 901/1 |
| 2016/0070947 A1 | 3/2016 | Bogaki et al. | |
| 2016/0119747 A1 | 4/2016 | Ryan et al. | |
| 2016/0238773 A1 | 8/2016 | Shei et al. | |
| 2016/0306446 A1 | 10/2016 | Chung et al. | |
| 2016/0345847 A1 | 12/2016 | Gu et al. | |
| 2017/0061226 A1 | 3/2017 | Kok et al. | |
| 2017/0076442 A1 | 3/2017 | Schoenmeyer et al. | |
| 2017/0076521 A1 | 3/2017 | Chuang et al. | |
| 2019/0087013 A1 | 3/2019 | Chang et al. | |
| 2020/0241550 A1* | 7/2020 | Lin | G05D 1/0248 |

\* cited by examiner

MOBILE ROBOT PERFORMING MULTIPLE DETECTIONS USING IMAGE FRAMES OF SAME OPTICAL SENSOR

RELATED APPLICATIONS

The present application is a continuation-in-part application of U.S. patent application Ser. No. 16/425,955 filed on May 30, 2019, which is a continuation-in-part application of U.S. patent application Ser. No. 15/841,376 filed on Dec. 14, 2017, which claims the priority benefit of U.S. Provisional Application Ser. No. 62/514,349, filed on Jun. 2, 2017, the disclosures of which are hereby incorporated by reference herein in their entirety.

BACKGROUND

1. Field of the Disclosure

This disclosure generally relates to a mobile robot and, more particularly, to a mobile robot that performs the obstacle avoidance, positioning and object recognition according to image frames captured by the same optical sensor corresponding to lighting of different light sources.

2. Description of the Related Art

The smart home is one part of developing a smart city, and a cleaning robot has almost become one standard electronic product in a smart home. Generally, the cleaning robot is arranged with multiple functions to improve the user experience, e.g., including mapping of an operation area, obstacle detection and avoidance during operation. The current cleaning robot is employed with multiple types of sensors to perform these different detecting functions.

For example, the cleaning robot includes a sensor arranged at a top surface thereof to implement the visual simultaneous localization and mapping (VSLAM) by capturing images above the path by which the cleaning robot passes. In addition, the cleaning robot further adopts a front sensor to implement the obstacle detection and avoidance by capturing images in front of a moving direction of the mobile robot.

That is, the conventional cleaning robot needs multiple sensors to perform different detecting functions.

Accordingly, the present disclosure provides a mobile robot that performs the obstacle avoidance, positioning and object recognition according to the image frames captured by the same one optical sensor corresponding to lighting of different light sources.

SUMMARY

The present disclosure provides a mobile robot that performs the obstacle avoidance according to the image frame captured by an optical sensor when a laser diode is emitting light, and performs the visual simultaneous localization and mapping (VSLAM) according to the image frame captured by the optical sensor when a light emitting diode is emitting light.

The present disclosure further provides a mobile robot that determines a region of interest according to the image frame captured by an optical sensor when a laser diode is emitting light, and performs the object recognition in the region of interest of the image frame captured by the optical sensor when a light emitting diode is emitting light to reduce the computation loading and power consumption as well as improve the recognition correctness.

The present disclosure provides a mobile robot including a first light source, a second light source, a third light source, an optical sensor and a processor. The first light source is configured to project a transverse light section toward a moving direction at a first time interval. The second light source is configured to project a longitudinal light section toward the moving direction at a second time interval. The third light source is configured to illuminate a front area of the moving direction at a third time interval. The optical sensor is configured to respectively capture a first image frame, a second image frame and a third image frame within the first time interval, the second time interval and the third time interval. The processor is electrically coupled to the first light source, the second light source, the third light source and the optical sensor, and configured to perform range estimation according to the first image frame and the second image frame, and perform visual simultaneous localization and mapping according to the third image frame.

The present disclosure further provides a mobile robot including a first light source, a second light source, a pixel array and a processor. The first light source is configured to project a transverse light section toward a moving direction at a first time interval. The second light source is configured to project a longitudinal light section toward the moving direction at a second time interval. The pixel array includes a plurality of first pixels and a plurality of second pixels. The plurality of first pixels is configured to receive incident light via an IR light filter, and the plurality of second pixels is configured to receive incident light without via any light filter. The pixel array is configured to capture a first image frame, a second image frame and a third image frame respectively within a first time interval, a second time interval, and a third time interval between the first time interval and the second time interval. The processor is electrically coupled to the first light source, the second light source and the pixel array, and configured to perform range estimation according to the first image frame and the second image frame, and perform visual simultaneous localization and mapping according to pixel data of the third image frame associated with the plurality of second pixels.

The present disclosure further provides a mobile robot including a first light source, a second light source, a third light source, an optical sensor and a processor. The first light source is configured to project a transverse light section toward a moving direction at a first time interval. The second light source is configured to project a longitudinal light section toward the moving direction at a second time interval. The third light source is configured to illuminate a front area of the moving direction. The optical sensor is configured to capture a first image frame and a second image frame respectively within the first time interval and the second time interval. The processor is electrically coupled to the first light source, the second light source, the third light source and the optical sensor, and configured to identify an obstacle according to the first image frame and the second image frame, control the third light source to emit light within a third time interval and control the optical sensor to capture a third image frame within the third time interval when identifying the obstacle, determine a region of interest in the third image frame according to an image position of the identified obstacle, and recognize an object type of the identified obstacle within the region of interest using a learning model.

The present disclosure further provides a mobile robot including a first laser light source, a second laser light source, a LED light source and an optical sensor. The first laser light source is configured to project a transverse light section toward a moving direction at a first time interval. The second laser light source is configured to project a longitudinal light section toward the moving direction at a second time interval. The LED light source is configured to illuminate a front area of the moving direction at a third time interval. The optical sensor is configured to respectively capture a first image frame, a second image frame and a third image frame within the first time interval, the second time interval and the third time interval.

In the present disclosure, the mobile robot realizes multiple detecting functions by using a single optical sensor incorporating with different light sources activating at different times.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The mobile robot of the present disclosure is to operate using a single optical sensor incorporating with different light sources. The linear light source is used to find an obstacle and measure a distance of the obstacle as a reference for turning a moving direction of the robot. The illumination light source is used to illuminate a front area for the visual simultaneous localization and mapping (VSLAM) and the object recognition.

Figure 1A:
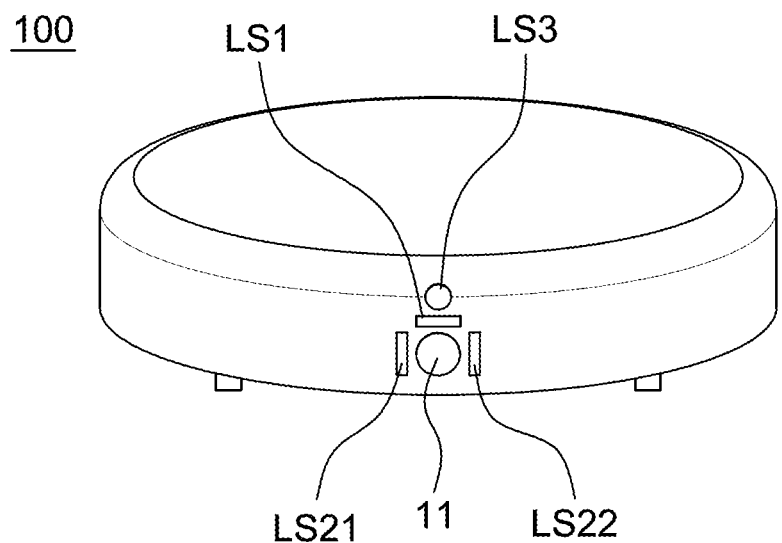
FIG. 1A is a schematic diagram of a mobile robot according to one embodiment of the present disclosure.

Referring to FIG. 1A, it is a schematic diagram of a mobile robot 100 according to one embodiment of the present disclosure. FIG. 1A shows that the mobile robot 100 is a cleaning robot, but the present disclosure is not limited thereto. The mobile robot 100 is any electronic robot that moves according to the imaging result to perform the transportation, communication and guiding.

Figure 1B:
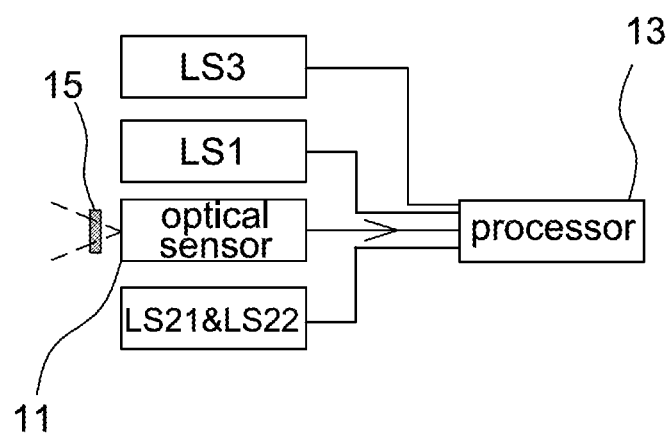
FIG. 1B is a schematic block diagram of elements of a mobile robot according to one embodiment of the present disclosure.

Please referring to FIG. 1B together, it is a schematic block diagram of a mobile robot 100 according to one embodiment of the present disclosure. The mobile robot 100 includes a first light source LS1, second light sources LS21 and LS22, a third light source LS3, an optical sensor 11 and a processor 13. The processor 13 is an application specific integrated circuit (ASIC) or a micro controller unit (MCU) that implements its functions using software, hardware and/or firmware. Although FIG. 1B shows two second light sources, it is only intended to illustrate but not to limit the present disclosure. The mobile robot 100 may include only one second light source.

The first light source LS1 includes, for example, a laser light source and a diffractive optical element. The diffractive optical element causes light emitted by the laser light source to generate a transverse projecting light after passing thereby such that the first light source LS1 projects a transverse light section toward a moving direction. The moving direction is along a side arranging the first light source LS1, the second light sources LS21 and LS22, the third light source LS3 and the optical sensor 11.

The second light sources LS21 and LS22 respectively include, for example, a laser light source and a diffractive optical element. The diffractive optical element causes light emitted by the laser light source to generate a longitudinal projecting light after passing thereby such that the second light sources LS21 and LS22 respectively project a longitudinal light section toward the moving direction.

In the present disclosure, the laser light source is, for example, an infrared laser diode (IR LD).

The third light source LS3 is, for example, an IR light emitting diode (LED), and used to illuminate a front area of the moving direction. An area illuminated by the third light source LS3 is preferably larger than or equal to a field of view of the optical sensor 11. In the present disclosure, when the third light source LS3 is lighted up, the first light source LS1 as well as the second light sources LS21 and LS22 are turned off.

Figure 2:
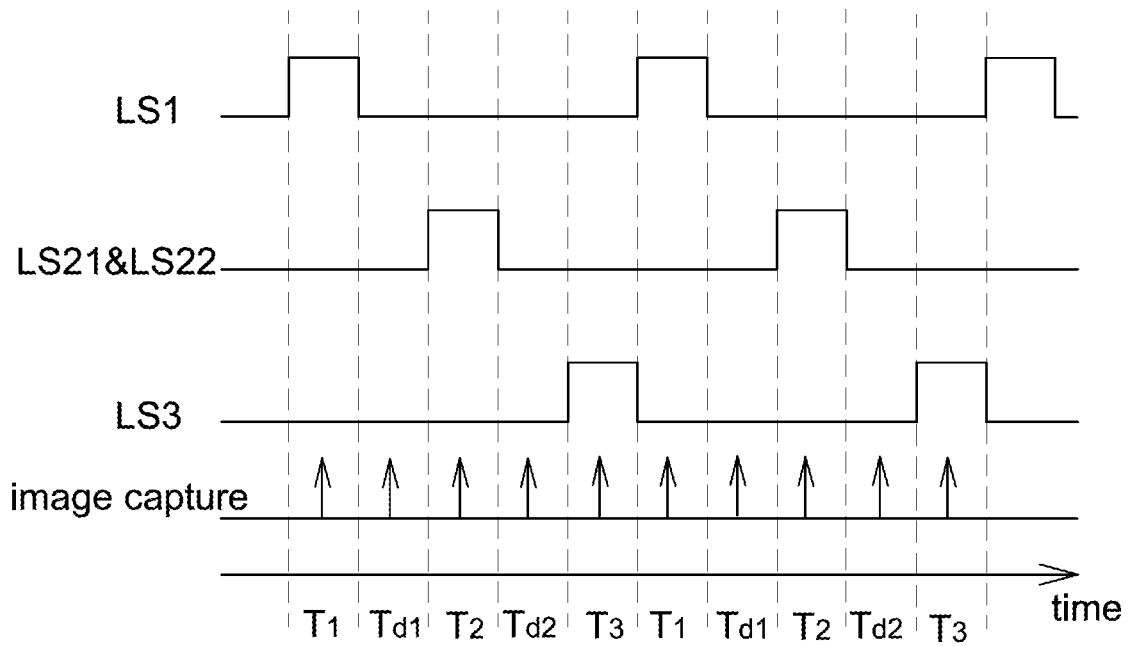
FIG. 2 is an operational timing diagram of a mobile robot according to a first embodiment of the present disclosure.

Please referring to FIG. 2, it is an operational timing diagram of a mobile robot 100 according to a first embodiment of the present disclosure. The first light source LS1 projects a transverse light section toward the moving direction at a first time interval T1. The second light sources LS1 and LS2 respectively project a longitudinal light section toward the moving direction at a second time interval T2. The third light source LS3 illuminates a front area of the moving direction at a third time interval T3.

Figure 6A:
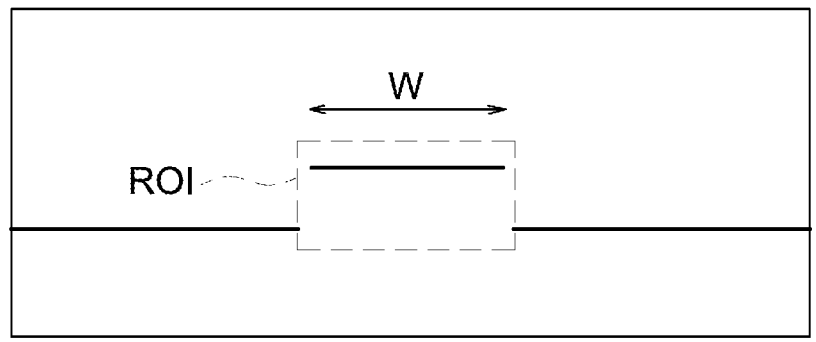
FIG. 6A is a schematic diagram of an image frame associated with a first light source and captured by an optical sensor of a mobile robot according to one embodiment of the present disclosure.
Figure 6B:
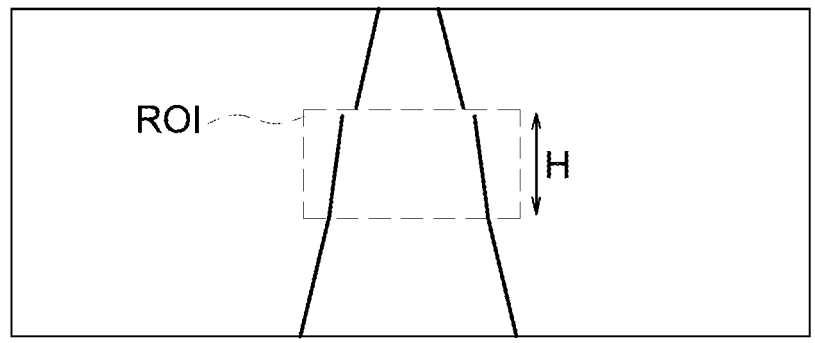
FIG. 6B is a schematic diagram of an image frame associated with a second light source and captured by an optical sensor of a mobile robot according to one embodiment of the present disclosure.

The optical sensor 11 is, for example, a CCD image sensor or a CMOS image sensor that captures a first image frame, a second image frame and a third image frame respectively within the first time interval T1, the second time interval T2 and the third time interval T3 using a sampling frequency. When the first image frame contains an obstacle, the first image frame has a broken line as shown in FIG. 6A; whereas, when the first image frame does not contain any obstacle, the first image frame only has a continuous (no broken line) transverse line. When the second image frame contains an obstacle, the second image frame has at least one broken line as shown in FIG. 6B, wherein an angle of the broken line is determined according a shape of obstacle and not limited to that shown in FIG. 6B; whereas, when the second image frame does not contain any obstacle, the second image frame only has two continuous (no broken line) tilted line. It is appreciated that FIGS. 6A and 6B are only intended to illustrate but not to limit the present disclosure.

It is appreciated that as the second light sources LS21 and LS22 project two parallel light sections on a moving surface, in the second image frame captured by the optical sensor 11, two parallel light sections present tilted lines. In addition, FIG. 6B only shows projected light sections on the moving surface captured by the optical sensor 11. When there is a wall in front of the mobile robot 100, the upper part of the second image frame will appear two parallel longitudinal light sections projected by the second light sources LS21 and LS22.

The position of broken line in the image frame reflects a position of the obstacle in front of the mobile robot 100. As long as the relationship between the position of broken line in the image frame and the actual distance of obstacles is previously recorded, a distance of one obstacle from the mobile robot 100 is obtainable when an image frame containing a broken line is captured.

As shown in FIG. 6A, the processor 13 already knows a predetermined distance from a transverse light section projected in front of the mobile robot 100 by the first light source LS1. Using the triangulation, the processor 13 calculates the distance and width of an obstacle when a broken line appears in an image of the transverse light section.

As shown in FIG. 6B, the processor 13 already knows longitudinal light sections being projected in front of the mobile robot 100 by the second light sources L521 and LS22. Using the triangulation, the processor 13 calculates the distance and height of an obstacle according to a position and length in an image of the longitudinal light sections (i.e., tilted line) when at least one broken line appears in the image of the longitudinal light sections.

The processor 13 is electrically coupled to the first light source LS1, the second light sources LS21 and LS22, the third light source LS3 and the optical sensor 11, and used to control ON/OFF of light sources and the image capturing. The processor 13 further performs the range estimation according to the first image frame (e.g., FIG. 6A) and the second image frame (e.g., FIG. 6B), and performs the VSLAM according to the third image frame (containing object images actually being acquired), wherein details of the VSLAM are known to the art and thus are not described herein. The present disclosure is to execute different detections according to image frames captured by the same optical sensor 11 corresponding to the lighting of different light sources.

Referring to FIG. 2 again, the optical sensor 11 further captures a first dark image frame within a first dark interval Td1 of first light source behind the first time interval T1. The first dark image frame is used for differencing with the first image frame. The optical sensor 11 further captures a second dark image frame within a second dark interval Td2 of second light source behind the second time interval T2. The second dark image frame is used for differencing with the second image frame. For example, the processor 13 subtracts the first dark image frame from the first image frame, and subtracts the second dark image frame from the second image frame to eliminate background noises.

Although FIG. 2 shows that the first dark interval Td1 is behind the first time interval T1 and the second dark interval Td2 is behind the second time interval T2, the present disclosure is not limited thereto. In other aspects, the first dark interval Td1 is arranged prior to the first time interval T1 and the second dark interval Td2 is arranged prior to the second time interval T2. In another aspect, the optical sensor 11 captures only one dark image frame (e.g., prior to T1, between T1 and T2 or behind T2) within every cycle (e.g., an interval sequentially lighting every light source). The processor 13 subtracts the dark image frame from the first image frame and subtracts the dark image frame (the same one) from the second image frame. In this way, background noises are also cancelled and the total frame rate is increased.

In one aspect, the optical sensor 11 includes a pixel array. All pixels of the pixel array receive incident light via an IR light filter. For example, FIG. 1B shows that an IR pass filter 15 is further arranged in front of the optical sensor 11. The IR pass filter 15 is formed with an optics (e.g., coating on a lens) in front of the pixel array, or directly arranged upon every pixel of the pixel array.

Figure 3:
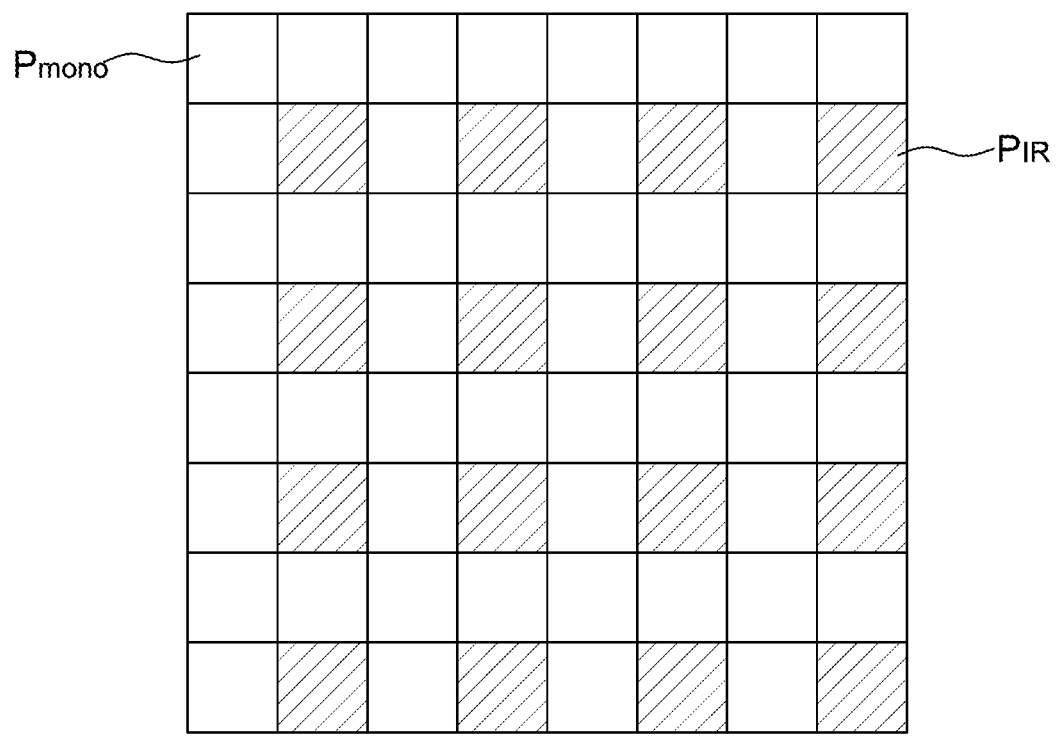
FIG. 3 is a schematic diagram of a pixel array of a mobile robot according to one embodiment of the present disclosure.

In another aspect, the pixel array of the optical sensor 11 includes a plurality of first pixels $P_{IR}$ and a plurality of second pixels $P_{mono}$, as shown in FIG. 3. The first pixels $P_{IR}$ are IR pixels, i.e. receiving incident light via a IR pass filter/film. The second pixels $P_{mono}$ receive incident light without via a IR pass filter/film. Preferably, the second pixels $P_{mono}$ receive incident light without passing any filter element. The incident light is referred to reflected light from the floor, wall and object in front of the mobile robot 100.

In the aspect including two pixel types, the first image frame and the second image frame mentioned above are formed by pixel data generated by the plurality of first pixels $P_{IR}$. That is, the processor 13 performs the range estimation only according to pixel data generated by the plurality of first pixels $P_{IR}$. The third image frame mentioned above is formed by pixel data generated by both the plurality of first pixels $P_{IR}$ and the plurality of second pixels $P_{mono}$ since the first pixels $P_{IR}$ and the second pixels $P_{mono}$ both detect infrared light when the third light source LS3 is emitting light. The processor 13 is arranged to process the pixel data corresponding to the lighting of different light sources.

In one aspect, the plurality of first pixels $P_{IR}$ and the plurality of second pixels $P_{mono}$ of the pixel array are arranged as a chessboard pattern as shown in FIG. 3. In other aspects, the first pixels $P_{IR}$ and the second pixels $P_{mono}$ are arranged in other ways, e.g., a left part or an upper part of the pixel array is arranged with the first pixels $P_{IR}$, and a right part or a lower part of the pixel array is arranged with the second pixels $P_{mono}$, but not limited thereto.

In the aspect that the first pixels $P_{IR}$ and the second pixels $P_{mono}$ are arranged in a chessboard pattern, the processor 13 further performs the pixel interpolation on the first image frame and the second image frame at first so as to fill interpolated data at positions in the first image frame and the second image frame corresponding the second pixels $P_{mono}$. After the pixel interpolation, the range estimation is performed.

When the pixel array of the optical sensor 11 is arranged as the chessboard pattern, the mobile robot 100 of the present disclosure may operate in another way to increase the frame rate of the range estimation and positioning (e.g., using VSLAM). In the aspect of FIG. 2, the frame rate of the range estimation and positioning is ⅕ of the sampling frequency of the optical sensor 11.

Figure 4:
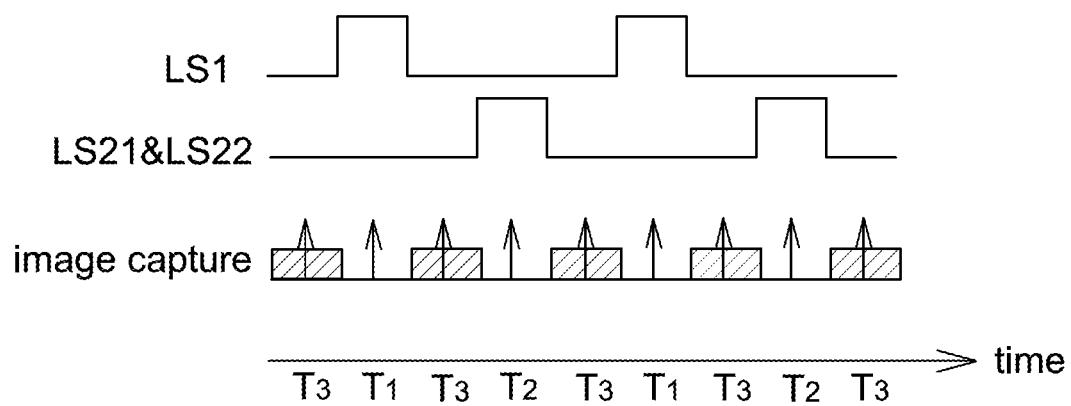
FIG. 4 is an operational timing diagram of a mobile robot according to a second embodiment of the present disclosure.

Referring to FIG. 4, it is an operational timing diagram of a mobile robot 100 according to a second embodiment of the present disclosure. The first light source LS1 projects a transverse light section toward the moving direction within a first time interval T1. The second light sources LS21 and LS22 respectively project a longitudinal light section toward the moving direction within a second time interval T2.

The pixel array of the optical sensor 11 captures a first image frame, a second image frame and a third image frame respectively within the first time interval T1, the second time interval T2 and a third time interval T3 between the first time interval T1 and the second time interval T2. That is, when the pixel array of the optical sensor 11 captures the third image frame, all light sources are not turned on. In FIG. 4, the third time interval T3 is shown by rectangular regions filled with slant lines.

The processor 13 performs the range estimation (e.g., including finding an obstacle and calculating a distance therefrom) according to the first image frame and the second image frame, wherein the first image frame and the second image frame are formed by pixel data generated by the plurality of first pixels $P_{IR}$. That is, when the first light source LS1 as well as the second light sources LS21 and LS22 are lighted up, pixel data associated with the first pixels $P_{IR}$ is not influenced by other colors of light, and thus the processor 13 is arranged to perform the range estimation according to the pixel data only associated with the plurality of first pixels $P_{IR}$.

In this embodiment, the third image frame is formed by pixel data generated by the plurality of second pixels $P_{mono}$.

Similarly, the processor 13 further performs the pixel differencing between the first image frame and the pixel data in the third image frame associated with the first pixels $P_{IR}$, and performs the pixel differencing between the second image frame and the pixel data in the third image frame associated with the first pixels $P_{IR}$ so as to eliminate background noises.

Similarly, when the first pixels $P_{IR}$ and the second pixels $P_{mono}$ are arranged in the chessboard pattern, before performing the range estimation, the processor 13 further performs the pixel interpolation on the first image frame and the second image frame to fill interpolated data at positions in the first image frame and the second image frame corresponding to the second pixels $P_{mono}$ at first. Then, the range estimation is performed.

In the second embodiment, the processor 13 performs the VSLAM according to pixel data in the third image frame associated with the second pixels $P_{mono}$. In this embodiment, the third light source LS3 is not lighted (e.g., the third light source LS3 may be omitted). Since the pixel data generated by the first pixels $P_{IR}$ exclude components outside IR spectrum, the third image frame of this embodiment is formed by pixel data generated by the plurality of second pixels $P_{mono}$. In addition, before performing the VSLAM according to the third image frame, the processor 13 further performs the pixel interpolation on the third image frame so as to fill interpolated data at positions in the third image frame corresponding to the first pixels $P_{IR}$.

It is seen from FIG. 4 that a frame rate of the range estimation is increased to ¼ (e.g., a frame period including T1+T2+2×T3) of the sampling frequency of the optical sensor 11, and a frame rate of the VSLAM is increased to ½ of the sampling frequency of the optical sensor 11.

However, when ambient light is not enough, the processor 13 may not able to correctly perform the VSLAM without lighting the third light source LS3. To solve this problem, the processor 13 further identifies ambient light strength according to the third image frame, e.g. comparing with a brightness threshold. When identifying that the ambient light is weak, the processor 13 further changes the lighting timing of the first light source LS1 as well as the second light sources LS21 and LS22. For example, the processor 13 controls the lighting of light sources and the image capturing as shown in FIG. 2. That is, under strong ambient light (e.g., an average brightness of the third image frame larger than a brightness threshold), the mobile robot 100 operates using the timing of FIG. 4; whereas under weak ambient light (e.g., the average brightness of the third image frame smaller than the brightness threshold), the mobile robot 100 operates using the timing of FIG. 2.

The present disclosure further provides a mobile robot that performs the ranging estimation and obstacle recognition according to images captured by the same optical sensor 11. When identifying that one obstacle is a specific object, e.g., a wire or socks, the mobile robot 100 directly moves across the obstacle; whereas when identifying that one obstacle is an electronic device, e.g., a cell phone, the mobile robot 100 dodges the electronic device without moving across it. The obstacle that can be moved across is determined previously according to different applications.

The mobile robot 100 of this embodiment is also shown as FIGS. 1A and 1B including a first light source LS1, second light sources LS21 and LS22, a third light source LS3, an optical sensor 11 and a processor 13. For example referring to FIG. 4, the first light source LS1 projects a transverse light section toward the moving direction within a first time interval T1; the second light sources LS21 and LS22 respectively project a longitudinal light section toward the moving direction within a second time interval T2. The third light source LS3 is used to illuminate a front area of the moving direction.

As mentioned above, to cancel the interference from ambient light, the optical sensor 11 further captures a first dark image frame, for differencing with the first image frame, within a first dark interval (e.g., T3 in FIG. 4) of first light source prior to or behind the first time interval T1; and captures a second dark image frame, for differencing with the second image frame, within a second dark interval (e.g., T3 in FIG. 4) of second light source prior to or behind the second time interval T2. The optical sensor 11 respectively captures the first image frame and the second image frame within the first time interval T1 and the second time interval T2.

In this embodiment, the pixel array of the optical sensor 11 receives incident light via the light filter 15.

The processor 13 identifies an obstacle according to the first image frame and the second image frame, wherein the method of identifying the obstacle has been described above and thus details thereof are not repeated herein. After the obstacle is found, the processor 13 controls the third light source LS3 to light up within a third time interval (e.g., T3 in FIG. 2) and controls the optical sensor 11 to capture a third image frame within the third time interval.

In this embodiment, before appearance of the obstacle is identified by the processor 13, the third light source LS3 is not lighted up, and thus the operational timing of the mobile robot 100 is shown as FIG. 4. When identifying that any obstacle appears, the processor 13 controls the third light source LS3 to emit light and controls the optical sensor 11 to capture one third image frame during the third light source LS3 is emitting light. In other aspects, more than one third image frame may be captured. In the present disclosure, capturing one third image frame is taken as an example for illustration. In this embodiment, the third image frame is for the object recognition using a pre-trained learning model.

After receiving the third image frame from the optical sensor 11, the processor 13 determines a region of interest (ROI) in the third image frame according to a position of obstacle (i.e. the position of broken line), e.g., shown in FIGS. 6A and 6B. As the present disclosure uses a single optical sensor, after the processor 13 identifies a position of obstacle and determines the ROI according to the first image frame and the second image frame, the ROI directly maps to a corresponding region in the third image frame.

In one non-limiting aspect, the ROI has a predetermined image size. That is, when the position (e.g., center or gravity center, but not limited to) of one obstacle is determined, the processor 13 determines a region of interest having the predetermined size at the position.

In another aspect, a size of the ROI is determined by the processor 13 according to the first image frame and the second image frame. In this case, when the obstacle is larger, the ROI is larger; on the contrary, the ROI is smaller.

The processor 13 then recognizes an object type of the obstacle in the ROI using a pre-trained learning model (e.g., embedded in the processor 13 by means of ASIC or firmware). As the learning model does not recognize (e.g., not calculating convolution) rest region in the third image frame outside the ROI, the computation loading, time and power consumption are significantly reduced.

Meanwhile, as the ROI contains a small number of object images, the recognition is not interfered by other object images to improve the recognition correctness.

In addition, to further improve the recognition correctness, the processor 13 further identifies a height of obstacle according to the second image frame, e.g., taking a length H of the broken line in FIG. 6B as the height of an obstacle. The learning model further recognizes the object type according to the object height.

In one aspect, the object height is used as the learning material by the data network architecture (e.g., including neural network learning algorithm, deep learning algorithm, but not limited to) together with the ground truth image in a training phase to generate the learning model.

In another aspect, in the training phase, the data network architecture only uses the ground truth image to generate the learning model. In operation, when the learning model calculates the probability of several possible objects, the height is used to filter some possible objects. For example, if the height of one object type categorized by the learning model exceeds the height identified according to the second image frame, even though this one object type has the highest probability, the learning model still excludes this object type.

The method of categorizing the object in an image by the learning model is known to the art, and thus details thereof are not described herein. Meanwhile, the incorporation between the learning model and the object height to recognize the obstacle is not limited to that described in the present disclosure.

In one aspect, as a capturing frequency of the optical sensor 11 is higher than a moving speed of the mobile robot 100, the processor 13 further controls the first light source LS1, the second light sources LS21 and LS22, and the third light source LS3 to turn off for a predetermined time interval after the third time interval T3 (i.e. after capturing one third image frame) till the obstacle leaves the projection range of the first light source LS1. In this way, it is able to prevent repeatedly recognizing the same obstacle. The predetermined time interval is determined according to, for example, the moving speed of the mobile robot 100 and the height determined according to the second image frame.

Figure 5:
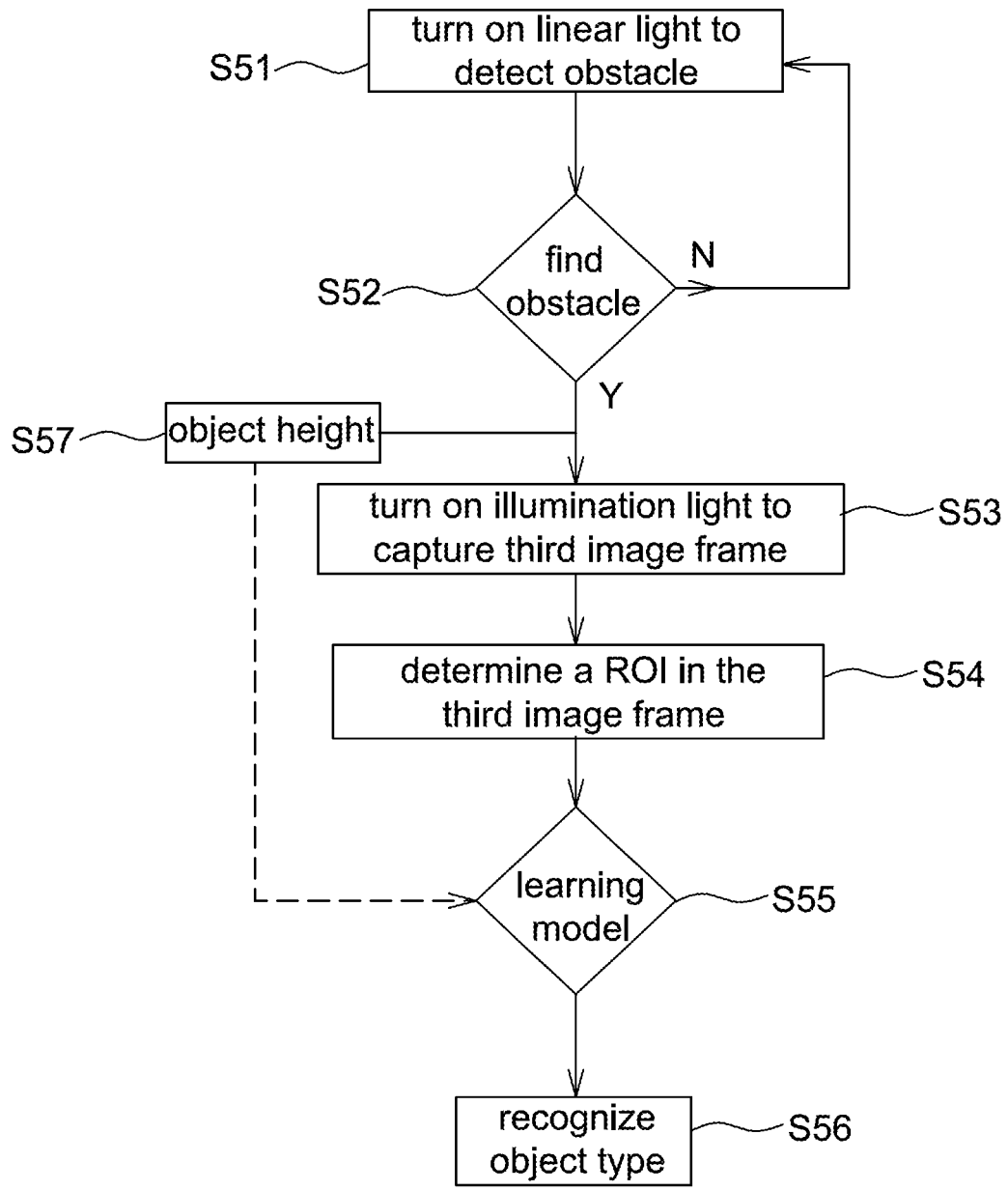
FIG. 5 is a flow chart of an operating method of a mobile robot according to a second embodiment of the present disclosure.

Referring to FIG. 5, it is a flow chart of an operating method of a mobile robot 100 according to one embodiment of the present disclosure, the method including the steps of: turning on linear light to detect an obstacle (Step S51); identifying whether an obstacle exists (Step S52); when there is no obstacle, moving back to Step S51 to continuous the detecting; whereas when there is one obstacle, turning on illumination light to capture a third image frame (Step S53); determining a region of interest (ROI) in the third image frame (Step S54); and using a learning model to recognize an object type (Steps S55-S56). This embodiment further includes an optional step: detecting an object height as an auxiliary in recognizing the object type (Step S57).

In this embodiment, the linear light includes, for example, the first light source LS1 as well as the second light source LS21 and LS22 mentioned above. The illumination light includes, for example, the third light source LS3 mentioned above. It is appreciated that positions of every light source shown in FIG. 1A is only intended to illustrate but not to limit the present disclosure.

Step S51: The processor 13 respectively controls the first light source LS1 as well as the second light source LS21 and LS22 to light up, for example, at the first time interval T1 and the second time interval T2 as shown in FIG. 4. Meanwhile, the processor 13 controls the optical sensor 11 to capture a first image frame and a second image frame respectively within the first time interval T1 and the second time interval T2.

Step S52: When identifying that the first image frame contains the broken line as shown in FIG. 6A or the second image frame contains the broken line as shown in FIG. 6B, the processor 13 identifies that there is an obstacle in front. The procedure then enters the Step S53; on the contrary, when the processor 13 identifies that both the first and second image frames do not contain any broken line, the Step S51 is entered to continuously detect an obstacle.

When identifying that the first image frame or the second image frame contains the broken line, the processor 13 further records (e.g., in the memory) a position of broken line as the object position.

Step S53: The processor 13 then controls the third light source LS3 to turn on, e.g., at the third time interval T3 shown in FIG. 2. The processor 13 also controls the optical sensor 11 to capture a third image frame, which contains at least one object image, within the third time interval T3. In an aspect that the processor 13 recognizes the object using a single image, the processor 13 controls the third light source LS3 to turn on for one third time interval V3. In one aspect, after the third time interval T3, the processor 13 controls the first light source LS1 as well as the second light sources LS21 and LS22 to operate using the timing shown in FIG. 4. In another aspect, after the third time interval T3, the processor 13 controls all light sources to turn off for a predetermined time interval to prevent detecting the same obstacle repeatedly and then operate using the timing shown in FIG. 4.

Step S54: The processor 13 then determines the ROI in the third image frame. The ROI is at the object position determined in the Step S52. As mentioned above, a size of the ROI is determined previously or determined according to a width W of the broken line in the first image frame (as shown in FIG. 6A) and a height H of the broken line in the second image frame (as shown in FIG. 6B).

Steps S55-S56: Finally, the processor 13 recognizes the object image within the ROI using the learning model trained before shipment to identify an object type.

Step S57: To increase the recognition correctness, when identifying an obstacle in the Step S52, the processor 13 further identifies an object height according to the second image frame, e.g., according to H in FIG. 6B. The identified object height helps the learning model to categorize and recognize the object type. The step S57 is selectively implemented.

After the object type is recognized, the processor 13 bypasses or dodges specific obstacles or directly moves across some obstacles according to previously determined rules. The operation after the object type being recognized is set according to different applications without particular limitations.

It should be mentioned that although the above embodiments are described in the way that the second light sources LS21 and LS22 are turned on and off together, the present disclosure is not limited thereto. In other aspects, LS21 and LS22 are turned on sequentially (and optical sensor capturing images correspondingly) as long as LS21 and LS22 respectively project a longitudinal light section toward the moving direction.

In addition, a number of first light source, the second light source and the third light source is not limited to those shown in FIG. 1A. The first light source, the second light source and the third light source may respectively include multiple light sources to turn on and off simultaneously.

In the present disclosure, the "transverse" is referred to substantially parallel to a moving surface (e.g., the ground), and the "longitudinal" is referred to substantially perpendicular to the moving surface. The object on the moving path is called the obstacle.

As mentioned above, the conventional cleaning robot adopts multiple types of sensors to respectively implement different detecting functions, and has the issues of high computation loading, time and consumption power as well as low recognition correctness. Accordingly, the present disclosure further provides a mobile robot suitable to smart home (e.g. FIGS. 1 and 2) and an operating method thereof (e.g. FIG. 5) that achieve the objective of obstacle avoidance, positioning and object recognition according to the detection result of a single image sensor.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A mobile robot, comprising:
a first light source, configured to project a transverse light section toward a moving direction at a first time interval;
a second light source, configured to project a longitudinal light section toward the moving direction at a second time interval;
a third light source, configured to illuminate a front area of the moving direction at a third time interval;
an optical sensor, configured to respectively capture a first image frame, a second image frame and a third image frame within the first time interval, the second time interval and the third time interval; and
a processor, electrically coupled to the first light source, the second light source, the third light source and the optical sensor, and configured to
perform range estimation according to the first image frame and the second image frame, and
perform visual simultaneous localization and mapping according to the third image frame.

2. The mobile robot as claimed in claim 1, wherein
the first light source and the second light source respectively comprise an infrared (IR) laser diode; and
the third light source comprises an IR light emitting diode.

3. The mobile robot as claimed in claim 1, wherein the optical sensor is further configured to
capture a first dark image frame, for differencing with the first image frame, within a first dark interval prior to or behind the first time interval, and
capture a second dark image frame, for differencing with the second image frame, within a second dark interval prior to or behind the second time interval.

4. The mobile robot as claimed in claim 1, wherein the optical sensor comprises a pixel array, and all pixels of the pixel array are configured to receive incident light via an IR light filter.

5. The mobile robot as claimed in claim 1, wherein the optical sensor comprises a pixel array comprising a plurality of first pixels and a plurality of second pixels, the plurality of first pixels is configured to receive incident light via an IR light filter, and the plurality of second pixels is configured to receive incident light without via any light filter, wherein
the first image frame and the second image frame are formed by pixel data generated by the plurality of first pixels; and
the third image frame is generated by pixel data generated by both the plurality of first pixels and the plurality of second pixels.

6. The mobile robot as claimed in claim 5, wherein the plurality of first pixels and the plurality of second pixels are arranged in a chessboard pattern.

7. The mobile robot as claimed in claim 6, wherein the processor is further configured to perform pixel interpolation on the first image frame and the second image frame.

8. A mobile robot, comprising:
a first light source, configured to project a transverse light section toward a moving direction at a first time interval;
a second light source, configured to project a longitudinal light section toward the moving direction at a second time interval; and
a pixel array, comprising a plurality of first pixels and a plurality of second pixels, the plurality of first pixels being configured to receive incident light via an IR light filter, and the plurality of second pixels being configured to receive incident light without via any light filter, wherein the pixel array is configured to capture a first image frame, a second image frame and a third image frame respectively within a first time interval, a second time interval, and a third time interval between the first time interval and the second time interval; and
a processor, electrically coupled to the first light source, the second light source and the pixel array, and configured to
perform range estimation according to the first image frame and the second image frame, and
perform visual simultaneous localization and mapping (VSLAM) according to pixel data of the third image frame associated with the plurality of second pixels.

9. The mobile robot as claimed in claim 8, wherein the processor is further configured to
perform differencing between the first image frame and pixel data of the third image frame associated with the plurality of first pixels to eliminate background noises, and
perform differencing between the second image frame and pixel data of the third image frame associated with the plurality of first pixels to eliminate background noises.

10. The mobile robot as claimed in claim 8, wherein the plurality of first pixels and the plurality of second pixels are arranged in a chessboard pattern.

11. The mobile robot as claimed in claim 10, wherein
the first image frame and the second image frame are formed by pixel data generated by the plurality of first pixels; and the third image frame is generated by pixel data generated by the plurality of second pixels.

12. The mobile robot as claimed in claim 11, wherein the processor is further configured to perform pixel interpolation on the first image frame and the second image frame before the range estimation, and perform pixel interpolation on the third image frame before the VSLAM.

13. The mobile robot as claimed in claim 8, wherein the processor is further configured to identify ambient light strength according to the third image frame.

14. The mobile robot as claimed in claim 13, wherein the processor is further configured to change lighting timing of the first light source and the second light source when identifying the ambient light strength being smaller than a threshold.

15. A mobile robot, comprising:

a first light source, configured to project a transverse light section toward a moving direction at a first time interval;

a second light source, configured to project a longitudinal light section toward the moving direction at a second time interval;

a third light source, configured to illuminate a front area of the moving direction;

an optical sensor, configured to capture a first image frame and a second image frame respectively within the first time interval and the second time interval; and a processor, electrically coupled to the first light source, the second light source, the third light source and the optical sensor, and configured to identify an obstacle according to the first image frame and the second image frame, control the third light source to emit light within a third time interval and control the optical sensor to capture a third image frame within the third time interval when identifying the obstacle, determine a region of interest in the third image frame according to an image position of the identified obstacle, and recognize an object type of the identified obstacle within the region of interest using a learning model.

16. The mobile robot as claimed in claim 15, wherein the learning model is not configured to recognize rest region in the third image frame outside the region of interest.

17. The mobile robot as claimed in claim 15, wherein the processor is further configured to identify a height of the obstacle according to the second image frame; and the learning model is further configured to recognize the object type according to the height.

18. The mobile robot as claimed in claim 15, wherein the processor is further configured to control the first light source, the second light source and the third light source to turn off for a predetermined time interval after the third time interval.

19. The mobile robot as claimed in claim 15, wherein the region of interest has a predetermined image size; or an image size of the region of interest is determined by the processor according to the first image frame and the second image frame.

20. The mobile robot as claimed in claim 15, wherein the optical sensor is further configured to capture a first dark image frame, for differencing with the first image frame, within a first dark interval prior to or behind the first time interval, and capture a second dark image frame, for differencing with the second image frame, within a second dark interval prior to or behind the second time interval.

* * * * *